US010676318B2

(12) United States Patent
Cortona et al.

(10) Patent No.: US 10,676,318 B2
(45) Date of Patent: Jun. 9, 2020

(54) CONFIGURING ACCESSING RIGHT TO ELEVATOR CONTROL SYSTEM

(71) Applicant: Inventio AG, Hergiswil (CH)

(72) Inventors: Elena Cortona, Zürich (CH); Frankie Schmid, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 0 days.

(21) Appl. No.: 16/348,981

(22) PCT Filed: Nov. 23, 2017

(86) PCT No.: PCT/EP2017/080167
§ 371 (c)(1),
(2) Date: May 10, 2019

(87) PCT Pub. No.: WO2018/099793
PCT Pub. Date: Jun. 7, 2018

(65) Prior Publication Data
US 2019/0276272 A1   Sep. 12, 2019

(30) Foreign Application Priority Data
Nov. 30, 2016 (EP) .................................. 16201290

(51) Int. Cl.
*B66B 1/34* (2006.01)
*B66B 5/00* (2006.01)
(Continued)

(52) U.S. Cl.
CPC ............. *B66B 1/3453* (2013.01); *B66B 1/34* (2013.01); *B66B 1/3461* (2013.01);
(Continued)

(58) Field of Classification Search
CPC ....... B66B 1/3453; B66B 1/34; B66B 1/3461; B66B 5/0087; B66B 19/00; H04W 76/10;
(Continued)

(56) References Cited
U.S. PATENT DOCUMENTS

2011/0247901 A1* 10/2011 Wilke ................ G07C 9/00896
187/247
2015/0251875 A1* 9/2015 Lustenberger ........ B66B 5/0031
700/275

(Continued)

FOREIGN PATENT DOCUMENTS

CN         1754816 A    4/2006
CN      205132785 U    4/2016
(Continued)

*Primary Examiner* — Edwin C Holloway, III
(74) *Attorney, Agent, or Firm* — William J. Clemens; Shumaker, Loop & Kendrick, LLP

(57) ABSTRACT

A control system of an elevator can be communicated with by a mobile control device to execute a maintenance and/or installation for the elevator. The control system includes a receiving element for receiving a request to establish a communication connection from the mobile control device, at least one processor to perform a first identification whether the mobile control device is authorized to communicate with the elevator, the at least one processor to perform a second identification whether a user of the mobile control device is authorized for using this mobile control device and/or for servicing this elevator, the at least one processor for matching a right of access of the mobile control device to the elevator depending on results of the first and the second identification, and a communication element to establish the requested communication connection according the matched right of access of the mobile control device.

12 Claims, 2 Drawing Sheets

(51) Int. Cl.
*B66B 19/00* (2006.01)
*H04W 76/10* (2018.01)
*G07C 9/20* (2020.01)
*G07C 9/00* (2020.01)

(52) U.S. Cl.
CPC ............ *B66B 5/0087* (2013.01); *B66B 19/00* (2013.01); *G07C 9/215* (2020.01); *H04W 76/10* (2018.02)

(58) Field of Classification Search
CPC .......... G07C 9/215; G07C 2009/00769; G07C 2009/00793; G07C 9/00896; G07C 9/00904; G07C 2209/04; G07C 2209/08
USPC .......................................... 340/5.28; 187/391
See application file for complete search history.

(56) References Cited

U.S. PATENT DOCUMENTS

| | | | | |
|---|---|---|---|---|
| 2016/0009525 | A1* | 1/2016 | DePaola | ................. B66B 1/468 187/380 |
| 2016/0229665 | A1* | 8/2016 | Colombano | .............. B66B 5/00 |

FOREIGN PATENT DOCUMENTS

| | | | |
|---|---|---|---|
| JP | 2006143361 | A | 6/2006 |
| JP | 4873916 | B2 | 2/2012 |
| KR | 101400404 | B1 | 5/2014 |
| WO | 9935076 | A1 | 7/1999 |
| WO | 2011034527 | A1 | 3/2011 |

\* cited by examiner

CONFIGURING ACCESSING RIGHT TO ELEVATOR CONTROL SYSTEM

FIELD

The invention relates to a method for configuring a control system of an elevator and an elevator facility with such a control system.

BACKGROUND

Every day many people depend on the safe and reliable operations of a building's vertical transportation system. Providing a competent maintenance is so important for the customers and also for the elevator companies. But the service provider for an elevator is not automatically the manufacturer company which installed this elevator. A maintenance of an elevator could be executed either by this elevator's OEM (Original Equipment Manufacturer) or by another independent company authorized by the manufacturer on a self-maintained basis. Today, most new elevators run on integrated or proprietary computer-based software that requires specialized tools and databases for proper maintenance that only the manufacturer can provide.

One advantage of using OEM maintenance is the ability to provide spare parts quickly and reduce overall downtime for repairs. In addition, with OEM maintenance the customers deal with the organization that designed the equipment and know its operating systems the best. Independent elevator maintenance companies often charge less for their maintenance programs than manufacturers. Generally, manufacturer's maintenance contracts are the most risk-free choice. If an elevator facility has connected with a proprietary equipment which is not provided by the manufacturer of this elevator or by an authorized user, then the proprietary equipment and its user will have just limited maintenance service options and generally will have to pay a premium for elevator maintenance. The proprietary equipment means an equipment, e.g. control device or measurement device, that the manufacturer of the elevator has no obligation to divulge any information about this equipment, although this equipment could be used for this elevator.

Generally, the manufacturer must supply all information, documents and function-tools for all their elevators to third parties which are required for adequate maintenance to provide safe operation of these elevators. In the maintenance information there is the information e.g. about a method of dealing with an occurred abnormality and steps of operating instruments used in maintenance working. However, the manufacturing companies may not provide or license the field devices, software interface or knowhow documents for specialists to third parties. A third party means in this application a third party individuals or a company that is not part of the manufacture company, for instance: competitors, building owners, property managers, self-maintainers, wholesalers, and other customers. For example, a diagnostic and commissioning tool which features improved connectivity with elevator control, provides error messages in local languages, and serves as a key to access the specialist level of the elevator control menu may not be available for third parties. As the same manner, some important documents such as technical catalogs and technical documents for specialists don't belong to the adequate maintenance information, but to desired advance or optimum maintenance information too. With advance or optimum maintenance information a technician can be advantaged e.g. in getting an increasing amount of technical information and data and accessing in real-time etc. So provision of maintenance, repair, mounting and installation services and construction works by a manufacturer usually has to be governed by general service provision conditions.

WO201134527 describes a method for remote access to multiple subsystems of an elevator control system. The method includes receiving a request to establish a remote connection at an elevator control subsystem from a remote user system.

WO9935076 describes an elevator system for which maintenance is tailored for each of the individual hardware components of the elevator.

SUMMARY

One object of the invention may be to govern and monitor a work condition to increase the data security of maintenance, repair, mounting and installation services and construction works for an elevator.

According to the present invention, a method for configuring a control system of an elevator is proposed, wherein the control system is accessible and/or communicated with a mobile control device in order to execute a maintenance and/or installation service for the elevator. The application for the control system may be a software module of the controller. The method disclosed herein comprises the following steps:

the control system receiving a request to establish a communication connection from the mobile control device, performing a first identification whether the mobile control device is authorized to communicate with the elevator, performing a second identification whether a user of the mobile control device is authorized for using this mobile control device and/or for servicing this elevator, matching a right of access of the mobile control device to the elevator depending on the results of the first and the second identification, and establishing the requested communication connection according the matched right of access of the mobile control device.

Usually, the mobile control device and the control system are a device and a system which are adapted to communicate with other devices or systems via a wireless or wired communication network of this elevator. During an installation or a maintenance work, this mobile control device and the control system also may be interconnected with an outside network. For the case of several or more mobile control devices, it may be that these mobile control devices are identical in hardware but having different unique identifiers (e.g. serial number). Those identifiers can be saved in the mobile control device already during its manufacturing or configured later before using it. For example, these unique identifiers may be encoded into a graphical code. Generally, every possible computer-readable code may be used for encoding the unique identifier. The unique identifier is unique for this elevator or its control system. Another possibility is that the unique identifier is unique with respect to a group or a large number of elevators. For example, the unique identifier may comprise a type and a serial number of the elevator.

In embodiments, the right of access of the mobile control device is classified in at least two levels of access which are assigned with different accessing possibility to data resources and/or functions of the elevator. Accordingly, the user can be verified with at least two different authorized rights in the second identification. The so authorized user can be called e.g. as authorized employee and authorized person. So it is possible that technicians have different access rights to the data resources and functions of the elevator, even if they are using a same mobile control device.

An "authorized employee" means that the maintenance and/or installation service provider's employees who have a more or complete accessing right, i.e. a first level of access (rights). The definition of the authorized employee may be limited to the service provider's actual employees. An "authorized person" means e.g. a service provider's contractors, agents, outsourcers and auditors etc., i.e. a second level of access (rights). The authorized person has less accessing rights than the authorized employee. Using an authorized mobile control device, a user who is identified as an authorized employee may be provided with the uppermost control functionality of the elevator.

With different levels and/or authorizations it is possible that a maintenance and/or installation service provider can avoid unnecessary security risks that important data like technical knowhow or private information of customers are available for an unauthorized third party. This classification must not be executed for one by one of elevators. It may be also done for a group of elevators or for all elevators of a same type or a same serial.

In embodiments, the classification of the right of access of the mobile control device depends on whether the user of the mobile control device is in his/her predefined accessing time period. The predefined accessing time period means the formal and/or scheduled working hours of the user. Even though a user was authorized and classified once as an authorized employee, he/her may not keep the full accessing right all the time. An example of such a scenario could be when an identified user with an authorized mobile control device tries to service an elevator in his/her private time.

According to an embodiment of the invention, the control system can send a message to a service center (e.g. a remote service center) of the elevator about the results of the first and/or the second identification. In practice, the authorization, the identification and the verification can also be accomplished e.g. with help of the remote service center. The remote service center may communicate with this mobile control device and the elevator control system via a wired or wireless network.

In embodiments, the communication procedure between the mobile control device and the control system and/or all the result of the first and/or the second identification can be saved as a protocol in a database or memory unit. This protocol includes e.g. all relevant records, logs, files, data reporting and other materials what can identify the accessing action.

A further aspect of the invention relates to an elevator with a control system which is configurable to control an accessing and/or a communication from a mobile control device, in order to execute a maintenance and/or installation for this elevator. The control system has a receiving element for receiving a request to establish a communication connection from the mobile control device, and a processor to perform a first identification whether the mobile control device is authorized to communicate with the elevator and to perform a second identification whether a user of this mobile control device can be authorized for using this device and/or for servicing this elevator. This processor is able to match a right of access of the mobile control device to the elevator depending on results of the first and the second identification. A communication element of the control system is to establish the requested communication connection according the matched right of access of the mobile control device.

This invention is not only suitable for elevators but also for escalators and moving walks. These and other aspects of the invention will be apparent from and elucidated with reference to the embodiments described hereinafter.

In the following, the idea of the instant invention is described using a different wording. The idea pertains to a communication between a mobile control device and an elevator system with the intention to receive information from the elevator system and controlling the elevator system in the context of maintenance and/or installation of the elevator system. Here, it is envisaged to provide different levels of access to authorized personnel having different roles. E.g. there may be two or three different levels of access. The first level of access may be the level with the most access rights. A further, second level may be a level with no or reduced access rights. In case of the second level being one with reduced access rights, an even further, third level may be a level without access rights.

Also, the mobile control device may be identified/authorized to/by the elevator system, thus gaining a certain level of access rights. E.g. only authorized and thus (to the elevator system or a remote center) identified mobile control devices may access and thus communicate with the elevator system while non-authorized/non-identified mobile control devices may be prohibited from communication with the elevator system at all.

Thus, a user of a certain access level must use an authorized mobile control device for access or would otherwise not receive access at all. Further, using an authorized mobile control, it may subsequently depend on the access level of a user whether or which access rights are granted. E.g. a user having an access level with reduced access rights, may only gain said access rights, even though using the mobile control device would, theoretically, allow also full access rights to a user having full access rights. Also, to a user having no access rights, no access would remain even when using said authorized mobile control device.

The access level of a certain user may also dependent on a current location of the user and/or a certain time. E.g. a user not being on location of a certain elevator system may not have a certain (e.g. full) access to the elevator system. Also, a certain (e.g. full) access may only be available during a certain time, e.g. official working hours of the user or a preset authorized time period, e.g. two hours starting from a certain point in time. Further, a certain (e.g. full) access may only be available for certain elevator systems, or for one or more certain types of elevator systems. The access rights may comprise access to an elevator system itself and/or access to additional tools and/or material, e.g. documentation, related to said elevator system. E.g. while the first access level grants full access to an elevator system and all available tools and documents, the second access level may only grant access to a reduced set of elevator functionality, tools and/or documents, e.g. a basic set of elevator functionality, tools and/or documents deemed necessary to provide a certain (reduced) basic service for said elevator system.

Below, embodiments of the present invention are described in more detail with reference to the attached drawings.

DESCRIPTION OF THE DRAWINGS

Embodiments of the invention are described with reference to the accompanying drawings. In the drawings, like reference numbers may indicate identical or functionally similar elements.

DETAILED DESCRIPTION

Figure 1:
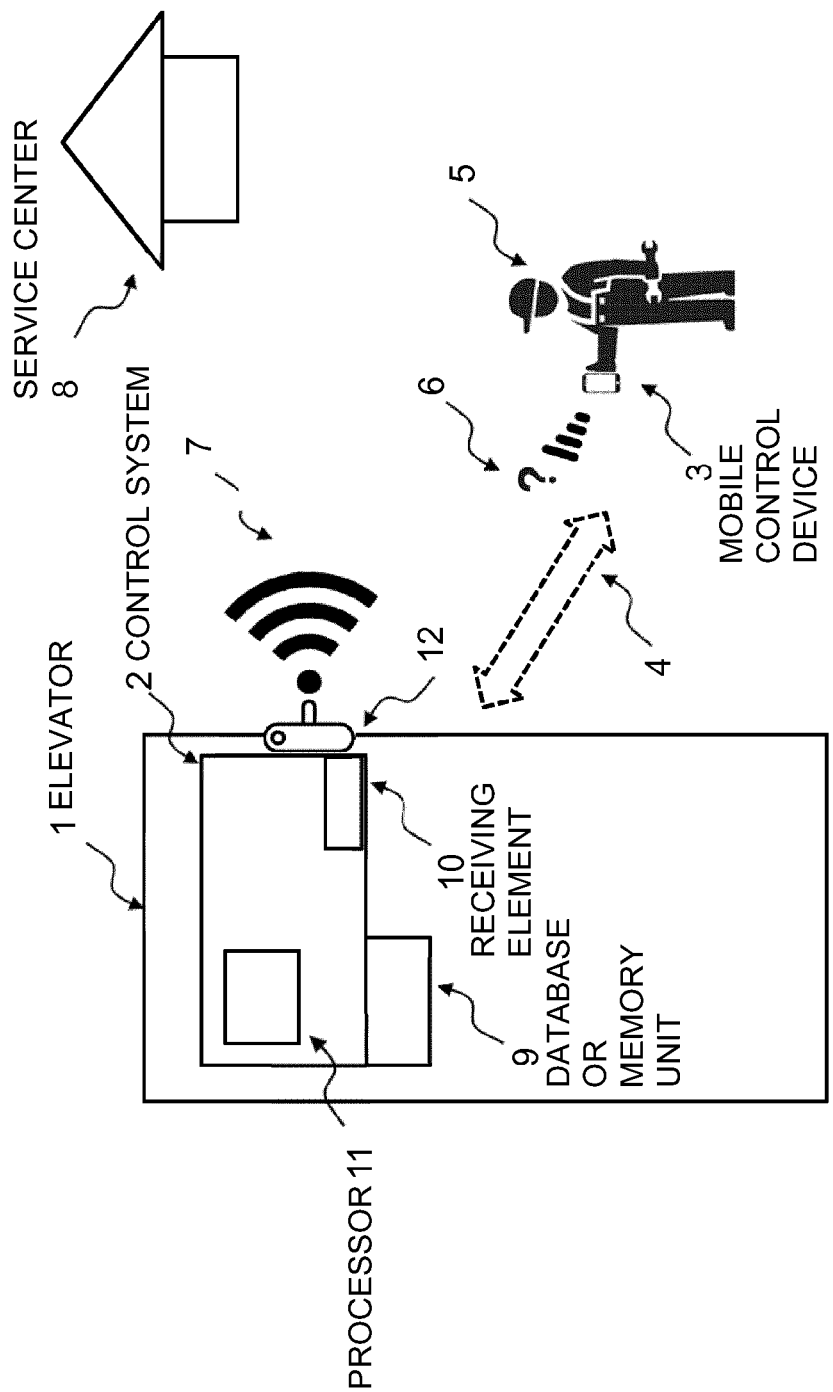
FIG. 1 is a schematic diagram of an elevator with a control system in communication with a mobile control device of a user according to the invention.

FIG. 1 represents an elevator 1 with a control system 2. A user 5 with a mobile control device 3 wants to execute a maintenance or installation working for this elevator 1. The control system 2 is e.g. a software module and the mobile control device 3 could be a handheld device such as a smartphone, tablet computer or laptop. The control system 2 has a receiving element 10, e.g. a signal receiver, to receive a request 6 sent from the mobile control device 3. A processor 11 of the control system 2 identifies at first whether the mobile control device 3 is authorized to communicate with this elevator 1, after then this processor 11 will execute a second identification whether this user 5 is authorized for using this mobile control device 3 to service this elevator 1. Furthermore, the processor 11 can match a right of access of the mobile control device 3 to the elevator 1, whereat this matching depends on the results of the first and the second identification.

The right of access of the mobile control device 3 may be classified in three levels of access when the user 5 can be verified as three different authorizations, for example as an authorized employee, an authorized person and other people. These levels of access are named e.g. Level-III, -II and -I respectively, they are different in accessing data resources and/or functions of the elevator 1. The classification is available either for a single elevator, for a group of elevators or all elevators of a same type.

Level-I allows the user 5 as an unauthorized person only to access basic or adequate maintenance information. For this Level, the elevator control system 2 makes basic maintenance tools or control tools available for the user 5 for free. These maintenance/control tools are e.g. programs used by software engineers. In this case, not all the data resources of this elevator 1 are accessible, the user 5 has only limited or even no maintenance service options.

Level-II is classified for an authorized person. For this Level the control system 2 offers advanced maintenance information with enhanced functions to the user 5, e.g. for paying a reasonable license fee. The advantage maintenance information has maintenance tools providing (compared to the Level-I) additional diagnostic features. For the Level-II the user 5 gets more maintenance information but still cannot access all maintenance information in detail what is available for specialists.

Only classified in the Level-III, optimum or full maintenance information is available to user 5 so that he/she can get a higher or complete accessing right to documents including e.g. license of field devices, software interface or knowhow documents for specialists etc. For this case, the user 5 is normally an authorized actual employee of the manufactory company of this elevator 1.

Although user 5 was authorized and classified once in the Level-III, he/she may not be always assigned with the same accessing right. For example, a user 5 has been identified as an authorized employee for certain type of elevators. If this user 5 later intends to service another elevator 1 of the same type, he/her can no more retain the same accessing right with the Level-III for this elevator 1. A similar scenario could be that this user 5 wants to service an elevator 1 outside his/her normal or scheduled working hours or this user 5 changed his/her job to another company. In this case, the user 5 cannot get the full accessing right, even though he/her was verified as an authorized employee. For example, it can be prevented that the user 5 tries to work for a competitor company additionally and thus makes important or security documents available for this competitor.

This control system 2 has a communication element 12 e.g. a router to establish the requested communication connection 4 according the matched right of access of the mobile control device 3. This communication connection 4 may be in the form of Bluetooth and/or W-LAN (Wireless Local Area Network). Through this connection 4 the user 5 can communicate with the control system 2 by using the mobile control device 3. Then the user 5 can access data resources and call functions of this elevator 1.

The communication procedure between the mobile control device 3 and the control system 2 and/or all the results of the first and/or the second identification are saved as a protocol in the database or memory unit. The protocol, the accessible data resources and functions can be saved e.g. in a database or memory unit 9. The memory unit 9 could be a computer-readable medium, such as a floppy disk, a hard disk, an USB (Universal Serial Bus) storage device, a SD-card (Secure Digital), a RAM (Random Access Memory), a ROM (Read Only Memory), an EPROM (Erasable Programmable Read Only Memory) or a FLASH memory. The database 9 may be in or remote from the elevator 1, for example in the remote service center 8. Also, the database 9 may also be a part of the control system 2. The control system 2 and/or the mobile control device 3 can be communicatively interconnected with the database 9 and the service center 8 via network or Internet.

Figure 2:
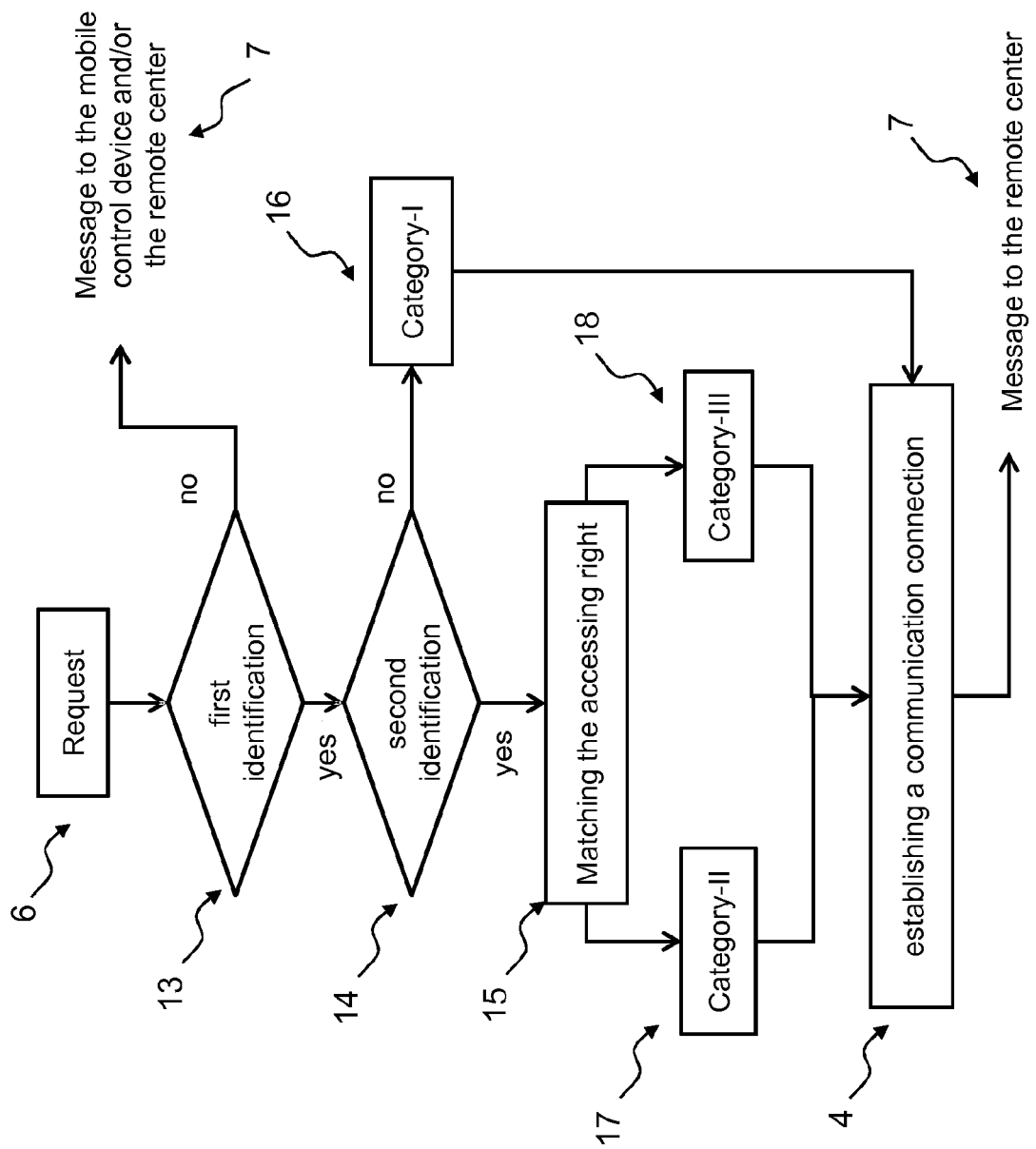
FIG. 2 is a flow diagram for a method for configuring the elevator control system of FIG. 1 according to embodiments of this invention.

FIG. 2 illustrates a flow diagram for a method for configuring an elevator control system 2 according to embodiments of this invention.

When the mobile control device 3 sends a request 6 to the elevator control system 2, the control system 2 has to identify this user 5 and this mobile control device 3. Then the control system 2 executes a first identification 13 to identify whether this control device 3 is allowed to communicate with this elevator 1. After the first identification 13 is confirmed, the control system 2 will identify further in the second identification 14 whether this user 5 is authorized for using this mobile control device 3 and/or for servicing this elevator 1. Otherwise, as a response to the request 6 the control system 2 will send a message 7 to the mobile control device 3 to inform the user 5 that this control device 3 is not permitted to communicate with this elevator 1. Furthermore, this message 7 can also be sent to a remote center 8 to inform the center 8 that an accessing attempt to this elevator 1 was denied. Therefore, the remote center 8 can be notified about e.g. the time, the number of the attempting and the identifier of this mobile control device 3.

If the second identification 14 was not confirmed, namely the user 5 cannot be authorized for the mobile control device 3 and/or for this elevator 1, a communication connection 4 will be built between the mobile control device 3 and the elevator control system 2, and the user 5 is assigned with an accessing right classified in Level-I 16. This means that the user 5 has only a restricted accessing possibility to adequate or basic maintenance Information.

If the mobile control device 3 and the user 5 both are authorized successfully for this elevator 1, the user 5 can get a full accessing right for this elevator 1. Otherwise, the control system 2 will classify further the user 5 as an authorized person in Level-II 17 or as an authorized employee in Level-III 18 and match his/her accessing right respectively 15. A user 5 as an authorized person has less access right than a user 5 as an authorized employee. The user 5 authorized with Level-II can only access advantage maintenance information while the user 5 authorized in Level-III has accessing right to optimum maintenance information. For the classification or identification necessary data can be defined and saved in the control system 2. For instance, every mobile control device 3 has an own identifier which could be either prestored in the mobile device 3 during manufacturing or configured before using this mobile device 3. This identifier is unique for this control system 2.

A message 7 can be sent to a remote center 8 after the confirmed second identification 14 and a communication connection 4 is established. So the remote center 8 knows that who is using which mobile device 3 is doing a service/maintenance for this elevator 1. The remote center 8 can also monitor this accessing to the elevator 1.

The reference symbols used in the drawings, and their meanings, are listed in summary form in the list of reference symbols below. In principle, identical parts are provided with the same reference symbols in the figures.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller may fulfil the functions of several items recited in the claims. The mere fact that certain measures are recited in mutually different dependent claims does not indicate that a combination of these measures cannot be used to advantage.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SYMBOLS

1 Elevator
2 Control system
3 Mobile control device
4 Communication connection
5 User
6 Request
7 Message
8 Service center
9 Database or memory unit
10 Receiving element/Receiver
11 Processor
12 Communication element/Router
13 The first identification
14 The second identification
15 Matching the accessing right
16 Classification in Level-I
17 Classification in Level-II
18 Classification in Level-III

The invention claimed is:

1. A method for configuring a control system of an elevator, wherein the control system is accessible by and/or communicated with a mobile control device to execute a maintenance and/or installation for the elevator, comprising the steps of:
the control system receiving a request from the mobile control device to establish a communication connection;
the control system performing a first identification whether the mobile control device is authorized to communicate with the elevator;
the control system performing a second identification whether a user of the mobile control device is authorized for using the mobile control device and/or for servicing the elevator;
the control system matching a right of access of the mobile control device to the elevator depending on results of the first identification and the second identification; and
the control system establishing the requested communication connection according the matched right of access of the mobile control device.

2. The method according to claim 1 wherein the right of access of the mobile control device is classified in one of at least two levels of access which are different in accessing possibility to data resources and/or functions of the elevator.

3. The method according to claim 1 wherein the user is verified with one of at least two different authorized rights in the second identification.

4. The method according to claim 1 wherein a classification of the right of access of the mobile control device depends on whether the user of the mobile control device uses the mobile control device during a predefined accessing time period.

5. The method according to claim 1 wherein the control system sends a message to a service center of the elevator about result of the first identification and/or the second identification.

6. The method according to claim 1 including saving a communication procedure between the mobile control device and the control system and/or the result of the first identification and/or the second identification as a protocol in a database or memory unit.

7. An elevator with a control system that is configurable to control an accessing and/or a communication from a mobile control device in order to execute a maintenance and/or installation for the elevator, the control system comprising:
a receiving element for receiving a request to establish a communication connection from the mobile control device;
a processor for performing a first identification whether the mobile control device is authorized to communicate with the elevator;
the processor performing a second identification whether a user of the mobile control device is authorized for using the mobile control device and/or for servicing the elevator;
the processor matching a right of access of the mobile control device to the elevator depending on results of the first identification and the second identification; and
a communication element for establishing the requested communication connection according the matched right of access of the mobile control device.

8. The elevator according to claim 7 wherein the processor classifies the right of access of the mobile control device in one of at least two levels of access which are different in accessing possibility to data resources and/or functions of the elevator.

9. The elevator according to claim 7 wherein the processor verifies the user in one of at least two different authorized rights in the second identification.

10. The elevator according to claim 7 wherein the classification of the right of access of the mobile control device depends on whether the user of the mobile control device uses the mobile control device during a predefined accessing time period.

11. The elevator according to claim 7 wherein the communication element of the control system sends a message to a service center of the elevator about the result of the first identification and/or the second identification.

12. The elevator according to claim 7 including a memory unit or database for saving a protocol of a communication procedure between the mobile control device and the control system and/or the result of the first identification and/or the second identification.

* * * * *